United States Patent [19]

Reedy et al.

[11] Patent Number: 5,302,624
[45] Date of Patent: Apr. 12, 1994

[54] PROCESS FOR PRODUCING POLYSTYRENE FOAM

[76] Inventors: Michael E. Reedy, 42 First St., Keyport, N.J. 07735; Edward W. Rider, Jr., R.D. #1 Box 43 S. Plank Rd., Slate Hill, N.Y. 10973

[21] Appl. No.: 61,670

[22] Filed: May 14, 1993

Related U.S. Application Data

[62] Division of Ser. No. 891,866, Jun. 1, 1992, Pat. No. 5,218,006.

[51] Int. Cl.$^5$ .......................... C08J 9/14; C08J 9/224
[52] U.S. Cl. ........................................ 521/81; 521/76; 521/79; 521/91; 521/92; 521/98; 521/139
[58] Field of Search ..................... 521/76, 91, 92, 98, 521/139

[56] References Cited

U.S. PATENT DOCUMENTS

| Re. 26,378 | 10/1967 | Pottenger | 521/60 |
| 4,344,710 | 8/1982 | Johnson et al. | 264/53 |
| 4,424,287 | 1/1984 | Johnson et al. | 521/74 |
| 4,470,938 | 9/1984 | Johnson et al. | 264/50 |
| 4,940,738 | 7/1990 | Kress | 521/86 |
| 5,009,809 | 4/1991 | Kosin et al. | 521/76 |
| 5,009,810 | 4/1991 | Wason et al. | 521/76 |

*Primary Examiner*—Morton Foelak
*Attorney, Agent, or Firm*—Shea & Gould

[57] ABSTRACT

The present invention relates to a process to produce polystyrene foam comprising mixing a predetermined amount of masterbatch mix and a styrenic polymer, heating this mixture, injecting $CO_2$ and/or nitrogen, in gas or liquid form, as a blowing agent and subsequently extruding, cooling and drying the resulting polystyrene foam.

16 Claims, No Drawings

PROCESS FOR PRODUCING POLYSTYRENE FOAM

This is a division of application Ser. No. 07/891,866, filed Jun. 1, 1992, now U.S. Pat. No. 5,218,006.

FIELD OF THE INVENTION

This invention relates to a process for producing polystyrene foam utilizing a predetermined amount of masterbatch mix.

BACKGROUND OF THE INVENTION

Polystyrene foam, particularly in sheet form, is presently being made from a number of blowing agents which have many undesirable characteristics. Volatility, flammability, poor thermoforming qualities, brittle physical properties, high cost, or an adverse affect to the ozone layer are just a few. Examples of the blowing agents that produce these characteristics in the production of polystyrene foam would include aliphatic hydrocarbons and fully or partially halogenated hydrocarbon.

A variety of normally gaseous or liquid blowing agents have been proposed for olefinic or styrenic polymers, including virtually all of the common atmospheric gases and lower hydrocarbons.

For polystyrene, the $C_4$–$C_6$ alkanes have gathered widespread acceptance, especially pentane. Following a typical extrusion foaming step, the stock material is ordinarily aged before thermoforming into containers or the like. During aging, the foam cells and polymeric matrix become partially depleted of volatile hydrocarbons, which enter the atmosphere. However, potential atmospheric contamination by these by-products of foam manufacture has led workers to seek non-polluting alternative blowing agents, such as the usual atmospheric gases, e.g., nitrogen, carbon dioxide.

U.S. Pat. Nos. 4,344,710 and 4,424,287 disclose blowing agents which are blends of carbon dioxide and aliphatic or fully or partially halogenated hydrocarbons. These patents, however, state that the use of 100% carbon dioxide as a blowing agent has not been successfully employed due to the extreme volatility. Use of these materials is said to produce corrugation and surface defects.

Others have developed methods and apparatuses for injecting a gaseous blowing agent into a molten resin charge, such as polystyrene in an accurate and precise manner. One example of this can be seen in U.S. Pat. No. 4,470,938.

Numerous experiments have been aimed at first preparing a masterbatch mix of a plasticized blowing agent and nucleator in which the blowing agent is uniformly distributed, and subsequently this premixture is added to polystyrene which is then extruded into foam. However, it has been shown that it is not possible to mix polystyrene with such a blowing agent without premixture foaming, since the blowing agent decomposes at the melt temperature of the polystyrene. This is an undesirable effect.

U.S. Pat. No. 4,940,735 teaches preparation of a masterbatch containing 30 to 80 weight percent of a plasticizer, 20 to 70 weight percent of blowing agent, and 10 to 20 weight percent of a cell regulator. While this masterbatch mix is an improvement over earlier art, it does not have all of the advantages of the present invention.

Thus, the object of the present invention was to develop a masterbatch mix for the preparation of polystyrene foams which when used platicizes, improves impact, improves melt flow and strength, and nucleates the inert gases in polystyrene in order to shorten extrusion process time. Also, the masterbatch mix must be utilized with $CO_2$ or Nitrogen as the blowing agent. Moreover, the polystyrene foam produced have very fine cells and low densities, thus, thermoforming is easier.

The present invention relates to a process for producing polystyrene foam, said foam being prepared by extruding a styrenic polymer and a predetermined amount of masterbatch mix in conjunction with carbon dioxide, nitrogen or mixtures thereof as a blowing agent. The masterbatch plasticizes, improves flow rate, melt strength and nucleates the inert gases in the polystyrene foam which in turn shortens process time. The resulting polystyrene foam has a substantially uniform cell wall thickness and improved polymer melt strength and improved density.

DETAILED DESCRIPTION OF THE INVENTION

The masterbatch mix is a plasticizer which improves the flow characteristics of the foam. This masterbatch mix comprises essentially about 1 to 70 weight percent of stoichiometric amounts of monosodium citrate and sodium bicarbonate encapsulated in vegetable oil, about 3 to 50 weight percent of styrene-ethylene/butylene-styrene block copolymer, about 20 to 80 weight percent of alpha methyl styrene, and about 1 to 20 weight percent of white mineral oil. Also present is about 0.2 weight percent of silica which is not a required element of the masterbatch mix, but aides in maintaining the free flow capability of the masterbatch mix under long term storage conditions. The masterbatch mix also increases the amount of inert gas concentration. Inert gases such as $CO_2$ and/or Nitrogen have no plasticization capabilities and leave the polystyrene foam in a non-plasticized state. The masterbatch mix nucleates and chemically plasticizes the foam so that it is more flexible.

An essential element of the masterbatch is the alpha methyl styrene. All commercially available styrene polymers can be used as the polystyrene compound. However, it is essential that the Vicat softening temperature of the chosen styrene polymer be between 55 and 65 at 50° C./hr. One commercially known is Amoco's Resin 18–240 which has a Vicat softening temperature of 60.5 at 50° C./hr and 62.0 at 120° C./hr.

Another essential element of the masterbatch is the styrene-ethylene/butylene-styrene block copolymer. One commercially known is Shell's Kratron G 1650.

The blowing agent preferably used is that grade of carbon dioxide or nitrogen which is normally commercially available. For the purposes of this specification such carbon dioxide or nitrogen is referred to as 100 percent carbon dioxide or nitrogen even though they may contain minor impurities or amounts of other compounds.

The blowing agent can be added to a polymer melt in either a gaseous or liquid form or combinations thereof.

The use of an extrusion process for the manufacture of polystyrene foam is typical, but is not required. Such a process includes a primary extruder, a blowing agent addition system, a secondary extruder, an annular die, a sheet cutter or slitter and a sheet gathering device.

However, the use of this exact equipment set up is not required in the process of this invention.

Polystyrene foam is formed in a continuous process by delivering a well-mixed and uniform blend of styrenic polymer and masterbatch mix to the extruder throat. Masterbatch mix is preferably about 0.001 to 0.035 weight of the total mixture. Once in the screw, while being rotated at a controlled RPM, the blend of styrenic polymer and masterbatch mix, or feed, is heated to a temperature above the melting point of the blend, about 250° to 500° F. It is then delivered with the use of relatively stable pressure in the range of about 4,000-6,000 psi, to the point of injection. Here, an injection system delivers carbon dioxide in gas or liquid form and/or nitrogen in gas form, or combinations thereof, into the melted feed.

Next, the blowing agent, or carbon dioxide and/or nitrogen, and melted feed pass into a second extruder. This extruder is designed for maximum cooling capability. It is of much larger capacity than the first screw. In this screw, a minimum of shear is desired. It is achieved by keeping the screw's roof diameter constant. The molten feed and blowing agent are cooled to a temperature below the first temperature and above the melting temperature of the feed.

The feed exits this screw through a die at a temperature between about 250°-270° F. and a pressure of about 2,500-3,750 psi. The exiting material is stretched out over a cooling drum and drawn to the desired density. The polystyrene foam sheet is then slit and can be wound into large rolls.

EXAMPLE 1

The following were continuously fed into a mixer:
54.8% of equimolar amounts of monosodium citrate and sodium bicarbonate encapsulated in vegetable oil
30.5% of poly alpha methyl styrene
12.0% of styrene-ethylene/butylene-styrene block copolymer
7.5% of white mineral oil
0.2% silica which resulted in a masterbatch mix that was then fed into an extruder.

The masterbatch was melted at a temperature of 310° to 550° F. and $CO_2$ in a liquid form was injected as a blowing agent. The resulting mixture was subsequently extracted, cooled and dried. The Vicat softening temperature of the poly alpha methyl styrene was 60.5 (at 50° C./hr).

The resulting product had a density of 0.374 FTLB/in, a tensile strength of 194.3 psi, and a low cell density which resulted in easier thermoforming.

EXAMPLE 2

By feeding the following continuously into a mixer:
19.8% of equimolar amounts of monosodium citrate and sodium bicarbonate encapsulated in vegetable oil
67.5% of poly alpha methyl styrene
10.0% of styrene-ethylene/butylene-styrene block copolymer
2.5% of white mineral oil
0.2% silica
a masterbatch mix is obtained that can be fed into an extruder.

Following the same procedure as Example I, the resulting product would have similar characteristics.

EXAMPLE 3

By feeding the following continuously into a mixer:
38.8% of equimolar amounts of monosodium citrate and sodium bicarbonate encapsulated in vegetable oil
36.6% of poly alpha methyl styrene
14.4% of styrene-ethylene/butylene-styrene block copolymer
9.0% of white mineral oil
0.2% silica
a masterbatch mix is obtained that can be fed into an extruder.

Following the same procedure as Example I, the resulting product would have similar characteristics.

The present invention has been described with preferred embodiments. It is to be understood however that modifications and variations may be resorted to, without departing from the spirit and scope of the invention, as those skilled in the art would readily understand. These modifications and variations are considered to be within the scope of the appended claims.

What is claimed is:

1. A process for the preparation of polystyrene foams comprising:
   (A) feeding a predetermined amount of masterbatch mix and styrenic polymer to a first zone and heating said mixture to a first temperature above the melting point of said mixture to form a molten mixture wherein said masterbatch mix comprises:
      (1) monosodium citrate and sodium bicarbonate encapsulated in vegetable oil;
      (2) styrene-ethylene/butylene-styrene block copolymer;
      (3) poly alpha methyl styrene;
      (4) white mineral oil; and
      (5) silica;
   (B) passing said molten mixture through an injection zone wherein a gas such as $CO_2$ and/or nitrogen or mixtures thereof, in either gas or liquid form is injected into said molten mixture;
   (C) feeding said molten mixture and $CO_2$ and/or nitrogen or mixture thereof, in either gas or liquid form, into a second zone and cooling the molten mixture and $CO_2$ and/or nitrogen to a second temperature below the first temperature and above the melting temperature of the mixture; and
   (D) passing said mixture and $CO_2$ and/or nitrogen or mixtures thereof, through die means.

2. A process for the preparation of polystyrene foam according to claim 1 wherein said first temperature is between 250°-500° F.

3. A process for the preparation of polystyrene foam according to claim 1 wherein said second temperature is between 240°-285° F.

4. A process for the preparation of polystyrene foam according to claim 1 wherein said masterbatch mix is from 0.001 to 0.035 weight percent of said mixture of styrenic polymer and masterbatch mix.

5. A process for the preparation of polystyrene foam according to claim 1 wherein the gas injected is carbon dioxide in liquid form.

6. A process for the preparation of polystyrene foam according to claim 1, wherein the gas injected is carbon dioxide in gaseous form.

7. A process for the preparation of polystyrene foam according to claim 1, wherein the gas injected is nitrogen in liquid form.

8. A process for the preparation of polystyrene foam according to claim 1, wherein the gas injected is nitrogen in gaseous form.

9. A process for the preparation of polystyrene foam according to claim 2, wherein the pressure is between 4,000 and 6,000 psi.

10. A process for the preparation of polystyrene foam according to claim 3, wherein said second temperature is between 250° and 270° F.

11. A process for the preparation of polystyrene foams comprising:
(A) feeding a predetermined amount of masterbatch mix and styrenic polymer to a first zone and heating said mixture to a first temperature above the melting point of said mixture to form a molten mixture wherein said masterbatch mix comprises:
 (1) from 1 to 70 weight percent of stoichiometric amounts of monosodium citrate and sodium bicarbonate encapsulated in vegetable oil;
 (2) from 3 to about 50 weight percent of styrene-ethylene/butylene-styrene block copolymer;
 (3) from 20 to 80 weight percent of poly alpha methyl styrene;
 (4) from 1 to 20 weight percent of white mineral oil; and
 (5) from 0.1 to 0.3 weight percent of silica;
(B) passing said molten mixture through an injection zone wherein a gas such as $CO_2$ and/or nitrogen or mixtures thereof, in either gas or liquid form is injected into said molten mixture;
(C) feeding said molten mixture and $CO_2$ and/or nitrogen or mixture thereof, in either gas or liquid form, into a second zone and cooling the molten mixture and $CO_2$ and/or nitrogen to a second temperature below the first temperature and above the melting temperature of the mixture; and
(D) passing said mixture and $CO_2$ and/or nitrogen or mixtures thereof, through die means.

12. A process for the preparation of polystyrene foam according to claim 11, wherein said masterbatch mix comprises:
(1) 54.8% of equimolar amounts of monosodium citrate and sodium bicarbonate encapsulated in vegetable oil;
(2) 30.5% of poly alpha methyl styrene;
(3) 12.0% of styrene-ethylene/butylene-styrene block copolymer;
(4) 7.5% of white mineral oil; and
(5) 0.2% silica.

13. A process for the preparation of polystyrene foam according to claim 11, wherein said masterbatch mix comprises:
(1) 19.8% of equimolar amounts of monosodium citrate and sodium bicarbonate encapsulated in vegetable oil;
(2) 67.5% of poly alpha methyl styrene;
(3) 10.0% of styrene-ethylene/butylene-styrene block copolymer;
(4) 2.5% of white mineral oil; and
(5) 0.2% silica.

14. A process for the preparation of polystyrene foam according to claim 11, wherein said masterbatch mix comprises:
(1) 38.8% of equimolar amounts of monosodium citrate and sodium bicarbonate encapsulated in vegetable oil;
(2) 36.6% of poly alpha methyl styrene;
(3) 14.4% of styrene-ethylene/butylene-styrene block copolymer;
(4) 9.0% of white mineral oil; and
(5) 0.2% silica.

15. A process for the production of polystyrene foams according to claim 1, wherein the poly alpha methyl styrene is comprised of Amoco Resin 18-240.

16. A process for the preparation of polystyrene foam according to claim 1, wherein the styrene-ethylene/butylene-styrene block copolymer is comprised of Shell Kraton 1650.

* * * * *